US009626397B2

(12) United States Patent
O'Carrol (10) Patent No.: US 9,626,397 B2
(45) Date of Patent: Apr. 18, 2017

(54) DISCOUNTED FUTURE VALUE OPERATIONS ON A MASSIVELY PARALLEL PROCESSING SYSTEM AND METHODS THEREOF

(71) Applicant: Luan O'Carrol, Dublin (IE)

(72) Inventor: Luan O'Carrol, Dublin (IE)

(73) Assignee: Business Objects Software Limited, Dublin (IE)

( * ) Notice: Subject to any disclaimer, the term of this patent is extended or adjusted under 35 U.S.C. 154(b) by 246 days.

(21) Appl. No.: 13/766,318

(22) Filed: Feb. 13, 2013

(65) Prior Publication Data

US 2014/0229512 A1    Aug. 14, 2014

(51) Int. Cl.
*G06F 17/30* (2006.01)

(52) U.S. Cl.
CPC .. *G06F 17/30315* (2013.01); *G06F 17/30634* (2013.01)

(58) Field of Classification Search
CPC .............. G06Q 10/04; G06F 17/30315; G06F 17/30516; G06F 17/30634
USPC ......................................................... 707/803
See application file for complete search history.

(56) References Cited

U.S. PATENT DOCUMENTS

| 5,632,009 A * | 5/1997 | Rao ........................ G06F 3/023 715/201 |
| 6,681,230 B1 * | 1/2004 | Blott ........................ G06F 8/38 |
| 2002/0059203 A1 * | 5/2002 | Witkowski et al. .............. 707/3 |
| 2003/0097310 A1 * | 5/2003 | Ono ........................ G06Q 30/02 709/219 |
| 2003/0154282 A1 * | 8/2003 | Horvitz .................. H04L 29/06 709/226 |
| 2004/0215529 A1 * | 10/2004 | Foster ..................... G06Q 30/06 705/26.1 |
| 2007/0203893 A1 * | 8/2007 | Krinsky ............ G06F 17/30864 |
| 2010/0042553 A1 * | 2/2010 | Van Erlach ............ G06Q 40/06 705/36 R |

(Continued)

OTHER PUBLICATIONS

Garth Wells, "Calculating Running Totals", May 7, 2001, retrieved date Dec. 12, 2012, retrieved from www.sqteam.com/article/calculating-running-totals, 4pgs.

(Continued)

*Primary Examiner* — Merilyn Nguyen
(74) *Attorney, Agent, or Firm* — Buckley, Maschoff & Talwalkar LLC (57) ABSTRACT

A method for performing an iterative operation using columnar data on a massively parallel processing system includes arranging data from a data source in a columnar table format, receiving tabular data containing data points representing a forecast of future values, receiving instructions to perform an iterative calculation on the data points, and for a predetermined selection of the columnar data points, assigning portions of the predetermined selection to a parallel processing system and applying structured query language operators to the columnar data and the tabular data to calculate results of the iterative calculation. The method also includes analyzing the iterative operation to identify at least one invariant function, and creating a columnar data having data points representing the invariant function. A system for implementing the method and a non-transitory computer readable medium are also disclosed.

14 Claims, 3 Drawing Sheets

(56) References Cited

U.S. PATENT DOCUMENTS

| | | | | |
|---|---|---|---|---|
| 2010/0121677 A1* | 5/2010 | An | ............... | G06Q 10/04 |
| | | | | 705/28 |
| 2013/0031537 A1* | 1/2013 | Boehm | ............... | G06F 8/443 |
| | | | | 717/154 |
| 2013/0103615 A1* | 4/2013 | Mun | ............... | 705/36 R |
| 2013/0191185 A1* | 7/2013 | Galvin | ............... | G06Q 30/01 |
| | | | | 705/7.37 |

OTHER PUBLICATIONS

Erich Schneider et al., "SAP HANA Platform—Technical Overview: Driving Innovations in IT and in Business with In-Memory Computing Technology", May 2012, 20pgs.

\* cited by examiner

DISCOUNTED FUTURE VALUE OPERATIONS ON A MASSIVELY PARALLEL PROCESSING SYSTEM AND METHODS THEREOF

BACKGROUND

Business system architectures reflect technological conditions which evolved for business solutions. Database management systems evolved that optimized performance on hardware with limited main memory, where the slow disk I/O caused the main bottleneck. Disk access was optimized, for example, by minimizing the number of disk pages to be read into main memory when processing a query. Business software was built with a sequential processing paradigm. Data tables were fetched from the database, processed on a row-by-row basis, and pushed back to the database.

Technological database limitations have forced a separation of the data management solution into transactional and analytical processing. For example, online transaction processing (OLTP) systems can be highly normalized to data entry volume and to speed up inserts, updates, and deletes. This high degree of normalization can be disadvantageous when it comes to retrieving data—for example, when multiple tables may have to be joined. Slow data retrieval can severely impact performance of an OLTP system. Online application processing (OLAP) systems were developed to address the requirements of large enterprises to analyze data in a timely manner. OLAP systems can exploit specialized data structures designed to optimize read performance and provide quick processing of complex analytical data.

Massively Parallel Processing (MPP) systems coordinate multiple processing elements simultaneously to solve a problem. Such systems have led to the development of high-performance computer systems that perform complex scientific and commercial applications. However, iterative processes that are not often repeated, if at all, are not easily parallelized in a cost effective manner.

DETAILED DESCRIPTION

A system and method according to an embodiment can implement iterative calculations on a MPP system in a cost effective manner. Calculation of discounted cash flow (DCF), net present value (NPV), internal rate of return (IRR), etc. can each be performed in an iterative manner. Embodying systems and methods can perform these calculations on a one-off basis in an efficient and cost effective manner.

Embodying methods can be applied to the amortization of other amounts representing a forecast of future values—for example, iterative calculation of counts or volumes can be implemented. These calculations can be used in wastage, consumption, deterioration, etc. for industrial or natural processes.

Figure 1:
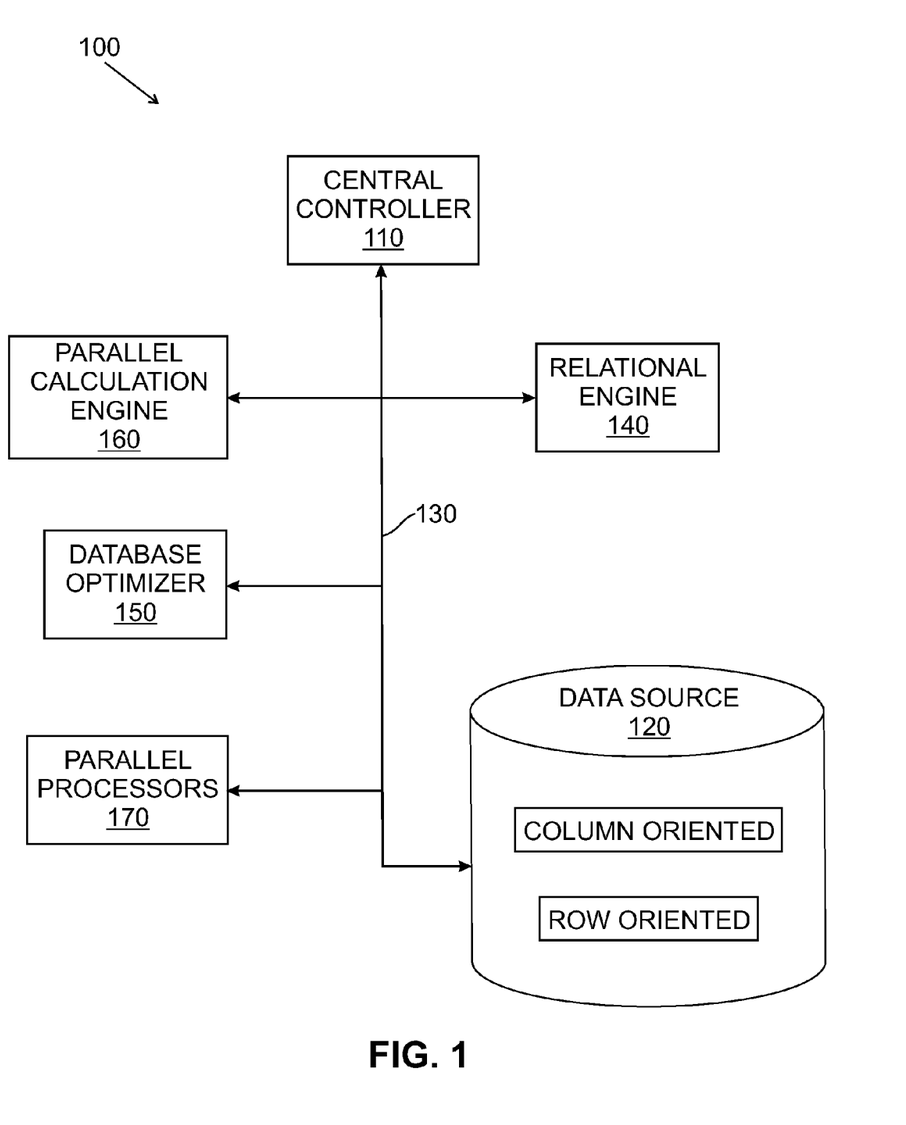
FIG. 1 depicts a system in accordance with some embodiments.

FIG. 1 depicts system 100 in accordance with one or more embodiments. System 100 can include at least one central controller 110. The central controller may be a processing unit, a field programmable gate array, discrete analog circuitry, digital circuitry, an application specific integrated circuit, a digital signal processor, a reduced instruction set computer processor, etc. The central controller can include internal memory (e.g., volatile and/or non-volatile memory devices). The central controller may access a computer application program stored in non-volatile internal memory, or stored in an external memory that can be connected to the central controller via an input/output (I/O) port. The computer program application may include code or executable instructions that when executed may instruct or cause the central controller and other components of the server to perform embodying methods, such as a method of performing iterative calculations using multiple processing elements to perform massively parallel processing. In one implementation central controller 110 can be one of the parallel processors forming the MPP system.

Central controller 110 can be in communication with components of system 100 via communication bus 130. Coupled to communication bus 130 is data store 120. Data store 120 can be part of an object-relational database management system, a relational database management system, or any other database management system.

In some embodiments, data source 120 is implemented in Random Access Memory (e.g., cache memory for storing recently-used data) and one or more fixed disks (e.g., persistent memory for storing the full database). Alternatively, data source 120 may implement an "in-memory" database, in which volatile (e.g., non-disk-based) memory (e.g., Random Access Memory) is used both for cache memory and for storing the full database. In some embodiments, the data of data source 120 may comprise one or more of row-based data stored in row format, column-based data stored in columnar format, and object-based data. Data source 120 may also or alternatively support multi-tenancy by providing multiple logical database systems which are programmatically isolated from one another. Moreover, the data of data source 120 may be indexed and/or selectively replicated in an index to allow fast searching and retrieval thereof.

Relational engine 140 is coupled to communication bus 130. The relational engine supports configuration and access by system 100 to both row- and column-oriented physical representations of relational tables. A system administrator can specify whether a table is to be stored in data source 120 in a row-oriented, or in a column-oriented, format. Row- and column-oriented database tables can be seamlessly combined into one SQL statement, and subsequently, tables can be moved from one representation form to the other.

A row-oriented formatted store can be more optimized for concurrent WRITE and READ operations. A row format can keep all index structures in-memory rather than persisting them on disk. A row-oriented formatted store can use a technology that is optimized for concurrency and scalability in multi-core systems. For example, Metadata or rarely accessed data might be stored in a row-oriented format.

Compared to this, the column-oriented store can be optimized for performance of READ operations. Column-oriented data can be stored in a highly compressed format in order to improve the efficiency of memory resource usage and to speed up the data transfer from storage to memory or from memory to CPU. The column store format can offer advantages in terms of data compression enabling access to larger amounts of data in main memory. For example, user and application data might be stored in a column-oriented format to benefit from the high compression rate and from highly-optimized access for selection and aggregation queries.

Database optimizer 150 can determine and implement a plan for accessing row or column stores configured by relational engine 140. The database optimizer manages data in the data store to achieve distribution to the multicore processors of the MPP. Optimization can include partitioning the data in sections so that calculations can be executed in parallel. Parallel calculation engine 160 can manage SQL processing instructions into an optimized model that allows parallel execution, which includes scaling to match the work load with the number of cores in the MPP.

Parallel processor 170 can include multiple processor cores, parallel processor arrays, etc. Parallel processor 150 can perform coordinated computations in parallel. The parallel processor can execute operations in parallel on the column-oriented store, which is vertically partitioned. Operations on different columns can be processed in parallel. If multiple columns need to be searched or aggregated, each of these operations can be assigned to a different processor core. In addition, operations on one column can be parallelized by partitioning the column into multiple sections that are processed by different processor cores.

The relational engine, database optimizer, parallel calculation engine and other components of system 100 can be implemented as dedicated hardware (digital and/or analog circuitry), software, and/or firmware modules.

Connected to system 100 via an electronic communication network can be one or more client computer(s). The client computers can be any type of computing device suitable for use by an end user (e.g., a personal computer, a workstation, a thin client, a netbook, a notebook, tablet computer, etc.). The client computer can be coupled to a disk drive (internal and/or external). The client computers can include a business intelligence tool application or any application that can pull data using relational database queries (e.g., data migration tools, management tools that can present data in graphic form (tabular, charts, etc.), and the like). The business intelligence tool application can, for example, be based on a relational database model, such as a table that is organized into rows and columns.

In an embodiment, a method can perform iterative calculation operations so as to leverage the power of parallel processors 170 on columnar data to be joined in Standard Query Language (SQL) commands. For example, discounted cash flow operations (DCF) involve net present value (NPV) and internal rate-of-return (IRR) operations, each of which involves calculations done in an iterative manner. Similarly calculation of depreciation and depreciation schedules can be iterative calculations that can be performed by parallel processors 170. Further, some embodiments can apply iterative calculation operations to other forecasts of future values, such as counts or volumes for industrial or natural processes.

An embodying method can calculate a set of rates, for example discount vs. time. Table I is representative of such a columnar data table:

TABLE I

| YEAR | RATE | COMP_RATE |
|---|---|---|
| 0 | 1 | 1 |
| 1 | 1 | 0.990099 |
| 2 | 1 | 0.980296 |
| 3 | 1 | 0.97059 |
| 4 | 1 | 0.96098 |
| 5 | 1 | 0.951466 |
| 6 | 1 | 0.942045 |
| 7 | 1 | 0.932718 |

TABLE I-continued

| YEAR | RATE | COMP_RATE |
|---|---|---|
| 8 | 1 | 0.923483 |
| 9 | 1 | 0.91434 |
| 10 | 1 | 0.905287 |
| 11 | 1 | 0.896324 |
| 12 | 1 | 0.887449 |
| 13 | 1 | 0.878663 |
| 14 | 1 | 0.869963 |
| 15 | 1 | 0.861349 |
| 16 | 1 | 0.852821 |
| 17 | 1 | 0.844377 |
| 18 | 1 | 0.836017 |
| 19 | 1 | 0.82774 |
| 20 | 1 | 0.819544 |
| 0 | 2 | 1 |
| 1 | 2 | 0.980392 |
| 2 | 2 | 0.961169 |
| 3 | 2 | 0.942322 |
| 4 | 2 | 0.923845 |
| 5 | 2 | 0.905731 |
| 6 | 2 | 0.887971 |
| 7 | 2 | 0.87056 |
| 8 | 2 | 0.85349 |
| 9 | 2 | 0.836755 |
| 10 | 2 | 0.820348 |
| 11 | 2 | 0.804263 |
| 12 | 2 | 0.788493 |
| 13 | 2 | 0.773033 |
| 14 | 2 | 0.757875 |

In accordance with the method, the rates of Table I can then be joined to the cash flow data provided by a client business intelligence tool, or with data stored in data source 120. The discounted value for a given period is just a projection or multiplication of the value and the joined rate. A complete set of cash flows can be discounted by using standard database operations for calculation and aggregation by a MPP system performing the iterative process steps in parallel.

By storing the cash flows in a suitable table structure, multiple sets of cash flows can be evaluated in parallel. Table II is a cash flow table, where period (POS) is equivalent to YEAR from Table I. POS can be equivalent to the period for which the value is recorded. The period can represent days, weeks, months, years etc. The period may also depend on when the cash flows are calculated—e.g., start-of-month, or end-of-month. Such considerations are external to the calculation—the rates for start-of-month cash flows could differ for those at the end-of-month.

TABLE II

| CASH FLOW | POS | VALUE |
|---|---|---|
| 1 | 0 | −150000 |
| 1 | 1 | 20000 |
| 1 | 2 | 20000 |
| 1 | 3 | 20000 |
| 1 | 4 | 20000 |
| 1 | 5 | 20000 |
| 1 | 6 | 20000 |
| 1 | 7 | 20000 |
| 1 | 8 | 20000 |
| 1 | 9 | 20000 |
| 1 | 10 | 20000 |
| 2 | 0 | −140000 |
| 2 | 1 | 25000 |
| 2 | 2 | 25000 |
| 2 | 3 | 25000 |
| 2 | 4 | 25000 |
| 2 | 5 | 25000 |
| 2 | 6 | 25000 |
| 2 | 7 | 25000 |

TABLE II-continued

| CASH FLOW | POS | VALUE |
|---|---|---|
| 2 | 8 | 25000 |
| 2 | 9 | 25000 |
| 2 | 10 | 25000 |
| 3 | 0 | −130000 |
| 3 | 1 | 24000 |
| 3 | 2 | 24000 |
| 3 | 3 | 24000 |
| 3 | 4 | 24000 |
| 3 | 5 | 24000 |
| 3 | 6 | 24000 |
| 3 | 7 | 24000 |
| 3 | 8 | 24000 |
| 3 | 10 | 24000 |
| 4 | 0 | −150000 |
| 4 | 1 | 35000 |
| 4 | 2 | 35000 |

For example, the following set of SQL statements can calculate NPV for a group of cash flows (indicated by the identifier in the CASH_FLOWS.CASHFLOW column) at a discount rate of 6% over a ten year period. The results are presented in Table III.

TABLE III

```
select "CASHFLOW", SUM("CASH_FLOWS"."VALUE" *
"RATES"."COMP_RATE")
from "CASH_FLOWS"
    LEFT JOIN "RATES" on
"CASH_FLOWS"."POS"="RATES"."YEAR"
where RATES."YEAR"<10 and "RATES"."RATE"=6
group by "CASHFLOW";
```

| CASH FLOW | NPV |
|---|---|
| 1 | −13966.154514 |
| 2 | 30042.3068575 |
| 3 | 33240.6145832 |
| 4 | 88059.2296005 |
| 5 | 122067.690972 |
| 6 | 70042.3068575 |
| 7 | 83645.6914061 |
| 8 | 120192.244872 |
| 9 | 117200.7718 . . . |
| 10 | 67200.7718255 |

In accordance with some embodiments, system 100 can be used to calculate multiple rates for multiple cash flows. The following set of SQL statements can result in the data presented in Table IV.

TABLE IV

```
select "CASHFLOW", "RATES", SUM("CASH_FLOWS"."VALUE" *
"RATES"."COMP_RATE")
from "CASH_FLOWS"
    LEFT JOIN "RATES" on
"CASH_FLOWS"."POS"="RATES"."YEAR"
where RATES."YEAR" <10 and "RATES"."RATE">9
group by "CASHFLOW", "RATES";
```

| | CASH FLOW | RATE | NPV |
|---|---|---|---|
| 1 | 1 | 5 | −7843.566488 |
| 2 | 1 | 6 | −13966.154514 |
| 3 | 1 | 4 | −1293.36779 |
| 4 | 1 | 7 | −19695.355022 |
| 5 | 1 | 3 | 5722.178436 |
| 6 | 1 | 8 | −25062.241784 |
| 7 | 1 | 2 | 13244.734126 |
| 8 | 1 | 1 | 21320.35152 |
| 9 | 1 | 1.5 | 167210.3464 . . . |

TABLE IV-continued

| 10 | 2 | 5 | 37695.54189 |
| 11 | 2 | 6 | 30042.30685 . . . |
| 12 | 2 | 4 | 45883.29026 . . . |
| 13 | 2 | 7 | 22880.80622 . . . |
| 14 | 2 | 3 | 54652.723045 |
| 15 | 2 | 8 | 16172.19777 |
| 16 | 2 | 2 | 64055.91765 . . . |
| 17 | 2 | 1 | 74150.4394 |
| 18 | 2 | 1.5 | 209012.9330 . . . |
| 19 | 3 | 5 | 40587.72021 . . . |
| 20 | 3 | 6 | 33240.61458 . . . |
| 21 | 3 | 4 | 48447.958652 |
| 22 | 3 | 7 | 26365.57397 . . . |
| 23 | 3 | 3 | 56866.61412 . . . |
| 24 | 3 | 8 | 19925.30985 . . . |
| 25 | 3 | 2 | 65893.68095 . . . |
| 26 | 3 | 1 | 75584.421824 |

Embodying methods and systems can perform these calculations with SQL database operations. Using SQL statements implemented in system 100 can allow this information to be obtained without the need to perform cross tier (xtier) functions. Early filtering of irrelevant, or useless values, can be performed and the calculation processing can be optimized to the data source (e.g., database) layout.

Figure 2:
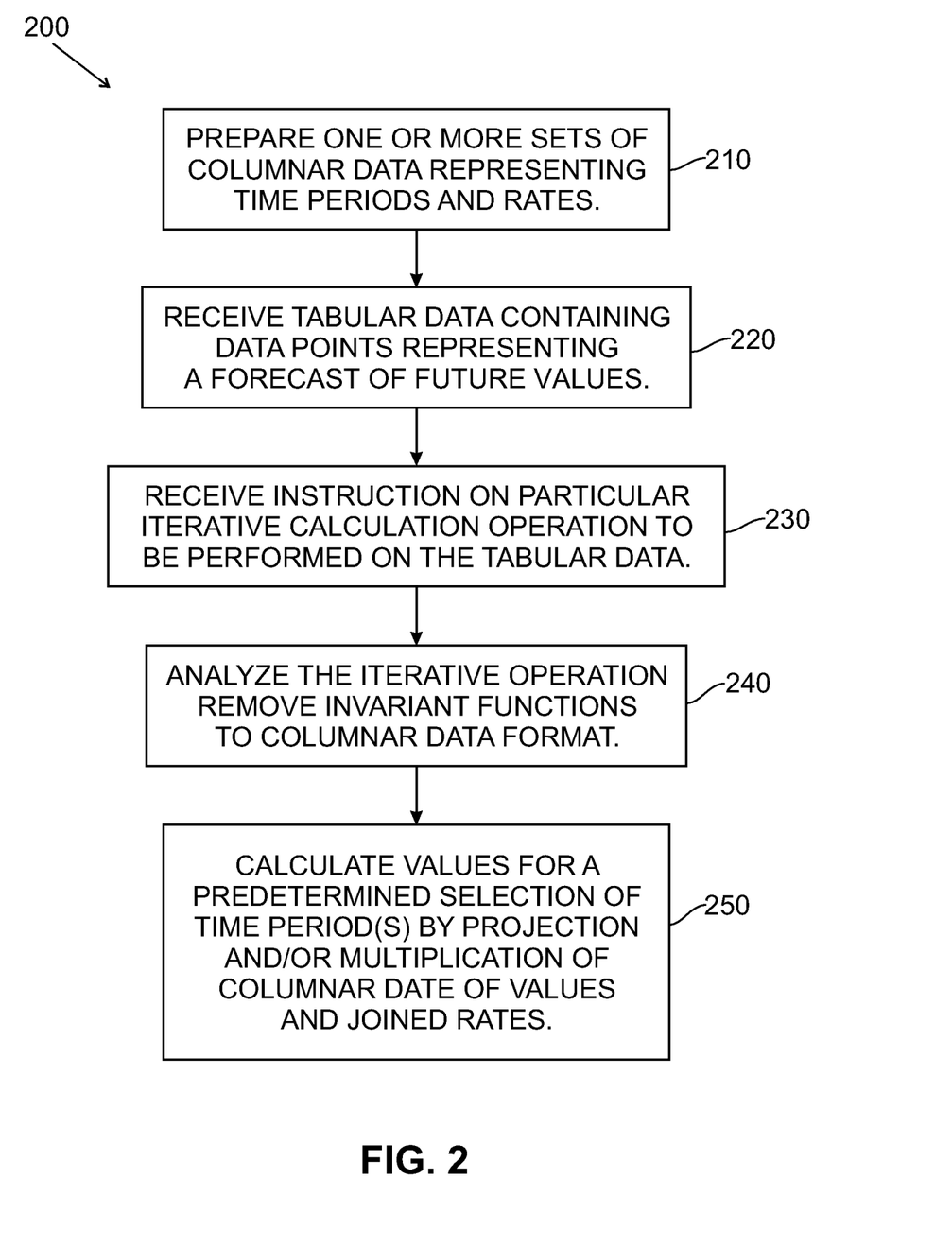
FIG. 2 depicts a process in accordance with some embodiments.

FIG. 2 depicts process 200 for performing iterative calculation operations using a massively parallel processor core in accordance with some embodiments. At step 210 a columnar table is prepared. The columnar table can contain data from data store 120 representing time periods and rates (such as shown above in Table I). Relational engine 140 can access the data and configure a relational table into the columnar data. Tabular data containing data points representing a forecast of future values can be received, step 220, and processed by data optimizer 150. The data optimizer can partition the data into sections for parallel processing.

Instructions are received, step 320, to perform a particular iterative calculation on the data. Instructions could be received from another application or (logical) application tier/layer. The instruction can be received, for example, from a business intelligence tool that is being directed by a user on an OLAP system. In an implementation, a user could program the SQL instruction directly. The particular iterative calculation can be, for example, discounted cash flow operations, depreciation calculation, depreciation schedule calculation, or other iterative calculations applied to counts or volumes in industrial or natural processes.

The database optimizer can analyze the iterative operation to identify invariant functions that can be removed from the iterative operation, step 240.

Figure 3:
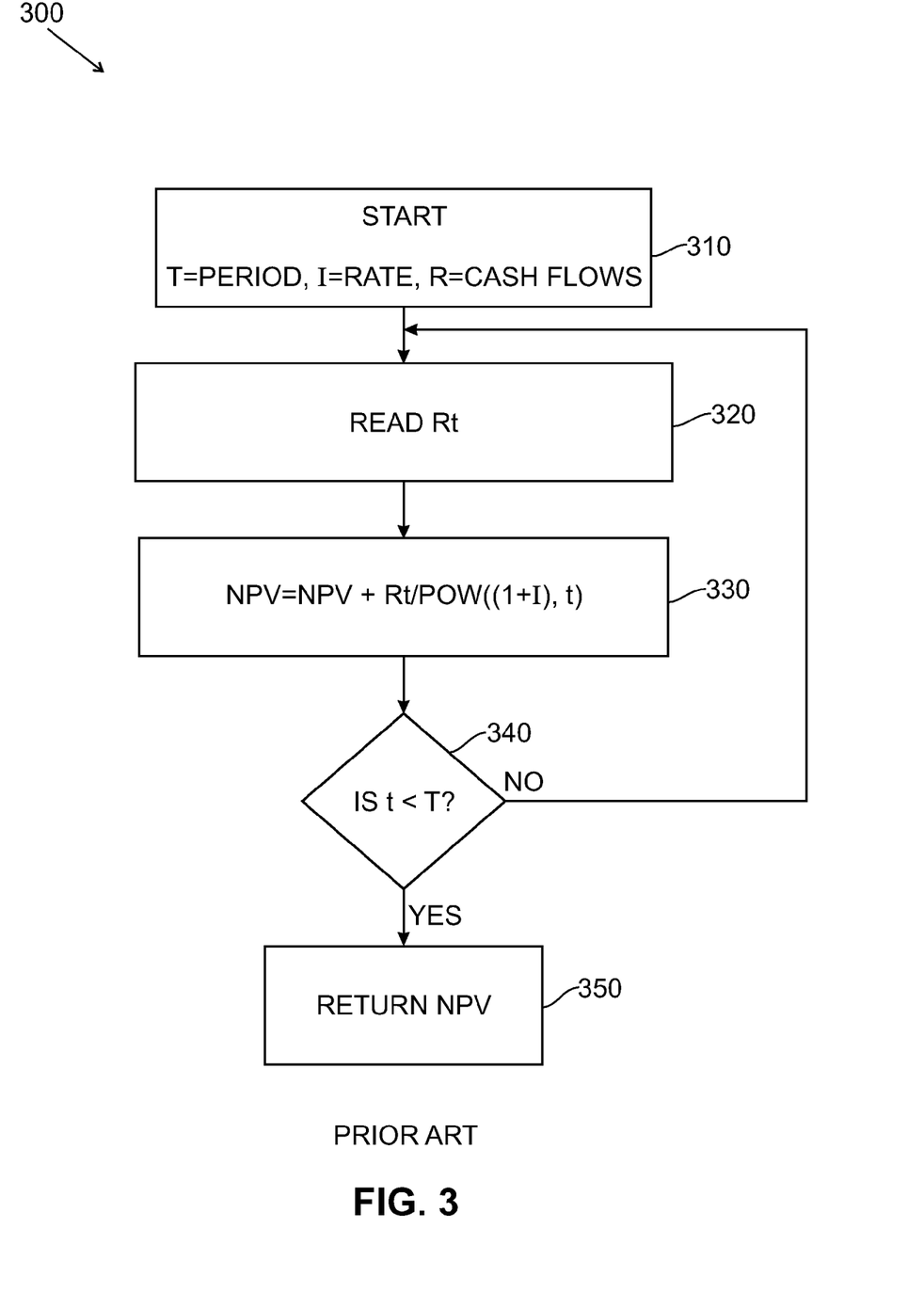
FIG. 3 depicts a process to calculate net present value.

By way of example, FIG. 3 depicts iterative calculation operation 300 for calculating the net present value of a future set of cash flows. The read operation within the loop formed by steps 320-340 can be expensive to implement. Depending upon the implementation of the loop, the branching can be expensive and preclude the inner steps being calculated in a parallel processor. The exponent (pow) function, can be relatively efficient, but it is an invariant and can be removed from the loop since it is unaffected by the input values. Accordingly, at step 240 the database optimizer removes the invariant function and creates a columnar data—e.g., time and rate. In one implementation, the database optimizer can perform a reaching definitions analysis to identify a loop invariant expression. In the present example, the power function is pre-calculated and stored in a rate table. The values are unaffected by any of the loop parameters and therefore can be reused across calculations. Accordingly, this rate table can be kept as long term storage to be available the next time such a value is encountered.

Process 200 continues to step 250 where values for a predetermined selection of time periods are calculated using SQL operators to perform projection and/or multiplication of columnar data values and joined rates.

In accordance with some embodiments, methods of calculations can be changed to form a suitable operation that can be used in a MPP-configured system, such as system 100. The change can include implementing table-based and/or set-based operations that improve the performance and scalability of the operations.

In some implementations, NPV can be expressed as a SUM of a series of projected cash flows. In a set based approach the discount rate can be calculated for all the periods involved in the calculation. These discount rate values can be stored and used to project the discounted value as a simple multiplication of the cash flow and the calculated compounded discount rate. NPV can be calculated as the sum of the projected values. The same discount set can be used to project the values of multiple calculations, and since the discount set does not depend on the cash flow these operations can be calculated in parallel.

IRR calculation also can involve an iterative calculation. In some embodiments, the IRR can be calculated as an extension of the NPV calculation. Because NPV can be calculated for any discount rate and these discounts can be calculated in parallel so to can IRR. By calculating NPV as a series of discount rates, the point at which a positive rate-of-return can be identified by locating where the next higher discount rate would produce a negative return. The IRR result is between these two discount rates. A more exact IRR can then be calculated by interpolation of these two discount rates.

Progressive refinement of the rate is possible by applying the same method with a more finely spaced rate table. This can also be expressed by calculating the NPV at a rate P and at a rate P1 (P1 being equal to P+1). Plotting of these calculations would be two curves, where data points illustrate either positive NPV or negative NPV. The IRR is found at the cross over point between the positive and negative data points. Because these NPVs, and the corresponding rates, span the point of IRR, the IRR can be interpolated.

The following SQL operation is one implementation that can determine the IRR by interpolation of the NPV curve.

```
SELECT CASHFLOW,
    RATE AS R1,
    RATE+1.0 AS R2,
    SUM
        ("CASH_FLOWS"."VALUE"*TR.COMP_RATE)
        AS V1,
    SUM
        ("CASH_FLOWS"."VALUE"*TR.COMP_RATE_P1)
        AS V2
FROM "CASH_FLOWS"
    LEFT JOIN RATES AS TR ON
        "CASH_FLOWS"."POS"=TR."YEAR"
WHERE TR."YEAR"<=:IN_YEARS
GROUP BY CASHFLOW, RATE
WITH HINT (OLAP_PARALLEL_AGGREGATION);
```

The above SQL statements can yield the results shown in TABLE V.

TABLE V

| CASH FLOW | E1 | R2 | V1 | V2 |
|---|---|---|---|---|
| 1 | 1 | 1 | 2 | 39426.09 | 29651.7 |
| 2 | 1 | 1.5 | 2.5 | 184443.7 | 175041.3 |
| 3 | 1 | 2 | 3 | 29651.7 | 20604.06 |
| 4 | 1 | 3 | 4 | 20604.06 | 12217.92 |
| 5 | 1 | 4 | 5 | 12217.92 | 4434.699 |
| 6 | 1 | 5 | 6 | 4434.699 | −2798.26 |
| 7 | 1 | 6 | 7 | −2798.26 | −9528.37 |
| 8 | 1 | 7 | 8 | −9528.37 | −15798.4 |
| 9 | 1 | 8 | 9 | −15798.4 | −21646.8 |
| 10 | 1 | 9 | 10 | −21646.8 | −27108.7 |
| 11 | 1 | 10 | 11 | −27108.7 | −32215.4 |
| 12 | 1 | 11 | 12 | −32215.4 | −36995.5 |
| 13 | 1 | 12 | 13 | −36995.5 | −41475.1 |
| 14 | 1 | 13 | 14 | −41475.1 | −45677.7 |
| 15 | 1 | 14 | 15 | −45677.7 | −49624.6 |
| 16 | 1 | 15 | 16 | −49624.6 | −53335.5 |
| 17 | 1 | 16 | 17 | −53335.5 | −56827.9 |
| 18 | 1 | 17 | 18 | −56827.9 | −60118.3 |
| 19 | 1 | 18 | 19 | −60118.3 | −63221.3 |
| 20 | 1 | 19 | 20 | −63221.3 | −66150.6 |
| 21 | 1 | 20 | 21 | −66150.6 | −68918.4 |
| 22 | 2 | 1 | 2 | 96782.61 | 84564.63 |
| 23 | 2 | 1.5 | 2.5 | 230554.6 | 218801.6 |
| 24 | 2 | 2 | 3 | 84564.63 | 73255.07 |
| 25 | 2 | 3 | 4 | 73255.07 | 62772.39 |
| 26 | 2 | 4 | 5 | 62772.39 | 53043.37 |

In Table V, the crossover occurs at period 6. In accordance with one implementation, the following SQL query can identify the crossover by filtering for the record where one value is positive and the other negative (i.e., the crossover), and then interpolating between the two values.

```
SELECT CASHFLOW,
    ((( R1 * V2 ) − ( R2 * V1 )) / ( V2 − V1 )) AS IRR
FROM :T_NPVS
WHERE V1>0.0 AND V2<0.0;
```

Calculation of payback can be an iterative operation that accumulates a running total to the point at which cash flow becomes positive. In accordance with some embodiments, a payback operation can be implemented by system 100.

In one implementation of calculating payback, a set of masks can be created that flag the years (or periods) to be considered for an investment—e.g., if payback is in two years, the cash flows from years 1 and 2 will be considered; If payback is in three years, the cash flows from years 1, 2 and 3 are considered; etc. Using a masking table the return from several sets of years can be projected. Summing these cash flows can calculate the return for the selected set of years. The payback period can then be determined by finding the year or period in which adjoining returns go from negative to positive.

In accordance with some embodiments, depreciation can be calculated by system 100. There are eight common methods for calculating depreciation (e.g., straight-line depreciation, declining-balance method (a/k/a reducing balance method), activity depreciation, sum-of-years-digits method, units-of-production depreciation method, units of time depreciation, group depreciation method, and composite depreciation method).

Of these methods straight-line, declining balance, and sum-of-years depreciation can be pre-calculated as a table of values (e.g., depreciation factor versus period) so that the depreciation for a given period can be simply calculated as a projection. The group based depreciation methods perform the same calculation on the aggregate amounts. The remaining methods depend upon usage (similar to IRR dependency on cash flow). The individual amounts can be project in the same way as cash flow is discounted. The depreciation calculation is performed by SQL operations to project and sums amounts.

In accordance with an embodiment of the invention, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein such as a method for performing iterative calculations using massively parallel processing systems accessing columnar data.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and data configurations have been described herein, note that any number of other configurations may be provided in accordance with embodiments of the invention. Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A computer-implemented method comprising:
   arranging, by a relational engine, data from a data source into columnar data points in a columnar table format;
   receiving one or more respective tabular data sets containing data points representing a discounted operation forecast of future values;
   receiving instructions to perform an iterative calculation on the data points;
   analyzing, by a database optimizer, the iterative calculation to identify at least one invariant function, the invariant function being a loop invariant function unaffected by input values;
   pre-calculating results of the at least one invariant function to create columnar data having data points representing the invariant function; and
   a parallel calculation engine assigning portions of the pre-calculated results to a parallel processing system and applying respective structured query language operator sets to the pre-calculated results and to respective multiple tabular data sets to calculate, in parallel, respective results of the iterative calculation.

2. The method of claim 1, wherein data of the columnar table represents time periods and rates.

3. The method of claim 1, further including:
   calculating discounted rates for a predetermined number of periods;
   determining discounted future values by projecting between the discounted rates and future value forecasts for the predetermined number of periods; and
   expressing a net present value of the future value forecasts as a sum of the projected future values.

4. The method of claim 3, further including:
   comparing consecutive net present values to identify where a rate-of-return associated with the net present value becomes positive; and
   interpolating each rate-of-return associated with two consecutive identified net present values to determine an internal rate of return.

5. The method of claim 1, further including:
   creating a set of masks that flag periods of the columnar data points;
   projecting future values for the flagged periods using a masking table; and
   summing the projected future values to calculate a return value for the flagged periods.

6. A non-transitory computer readable medium having stored thereon instructions which when executed by a processor cause the processor to perform the method of:
   arranging data from a data source into columnar data points in a columnar table format;
   receiving one or more respective tabular data sets containing data points representing a discounted operation forecast of future values;
   receiving instructions to perform an iterative calculation on the data points;
   analyzing, by a database optimizer, the iterative calculation to identify at least one invariant function, the invariant function being a loop invariant function unaffected by input values;
   pre-calculating results of the at least one invariant function to create columnar data having data points representing the invariant function; and
   a parallel calculation engine assigning portions of the pre-calculated results to a parallel processing system and applying respective structured query language operator sets to the pre-calculated results and to respective multiple tabular data sets to calculate, in parallel, respective results of the iterative calculation.

7. The non-transitory computer readable medium of claim 6, further including executable instructions to cause a processor to perform the steps of:
   calculating discounted rates for a predetermined number of periods;
   determining discounted future values by projecting between the discounted rates and future value forecasts for the predetermined number of periods; and
   expressing a net present value of the future value forecasts as a sum of the projected future values.

8. The non-transitory computer readable medium of claim 7, further including executable instructions to cause a processor to perform the steps of:
   comparing consecutive net present values to identify where a rate-of-return associated with the net present value becomes positive; and
   interpolating each rate-of-return associated with two consecutive identified net present values to determine an internal rate of return.

9. The non-transitory computer readable medium of claim 6, further including executable instructions to cause a processor to perform the steps of:
   creating a set of masks that flag periods of the columnar data points;
   projecting future values for the flagged periods using a masking table; and
   summing the projected future values to calculate a return value for the flagged periods.

10. A system comprising:
a central controller coupled via a communication bus to a relational engine, a database optimizer, a parallel calculation engine, and a parallel processor, the central controller executing instructions and controlling operation of the relational engine, database optimizer, parallel calculation engine, and parallel processor;
the relational engine configured to arrange data stored in a data store coupled to the communication bus into a columnar table, wherein an iterative calculation is to be performed on the data points;
the database optimizer configured to manage data in the data store and distribute the data to the parallel processor, the data optimizer configured to analyze the iterative calculation to identify at least one invariant function, the invariant function being a loop invariant function unaffected by input values;
the central controller configured to pre-calculate results of the at least one invariant function to create columnar data having data points representing the invariant function;
the parallel calculation engine configured to assign the pre-calculated results to the parallel processor;
the central controller configured to execute instructions that cause the system to:
receive one or more respective tabular data sets containing data points representing a discounted operation forecast of future values; and
assign portions of the pre-calculated results to a parallel processing system and apply respective structured query language operator sets to the pre-calculated results and to respective multiple tabular data sets to calculate, in parallel, respective results of the iterative calculation.

11. The system of claim 10, wherein data of the columnar table represents time periods and rates.

12. The system of claim 10, further including the central controller configured to execute instructions that cause the system to:
calculate discounted rates for a predetermined number of periods;
determine discounted future values by projecting between the discounted rates and future value forecasts for the predetermined number of periods; and
express a net present value of the future value forecasts as a sum of the projected future values.

13. The system of claim 12, further including the central controller configured to execute instructions that cause the system to:
compare consecutive net present values to identify where a rate-of-return associated with the net present value becomes positive; and
interpolate each rate-of-return associated with two consecutive identified net present values to determine an internal rate of return.

14. The system of claim 10, further including the central controller configured to execute instructions that cause the system to:
create a set of masks that flag periods of the columnar data points;
project future values for the flagged periods using a masking table; and
sum the projected future values to calculate a return value for the flagged periods.

* * * * *